United States Patent
Schäfer et al.

[11] Patent Number: 5,346,255
[45] Date of Patent: Sep. 13, 1994

[54] STEERING COLUMN WITH A SAFETY ELEMENT FOR A MOTOR VEHICLE EQUIPPED WITH AN INFLATABLE AIR BAG IN THE STEERING WHEEL

[75] Inventors: Burkhard Schäfer, Lemförde; Kai-Uwe Grams, Cappeln, both of Fed. Rep. of Germany

[73] Assignee: Lemforder Metallwaren AG, Lemforde, Fed. Rep. of Germany

[21] Appl. No.: 42,144

[22] Filed: Apr. 2, 1993

[30] Foreign Application Priority Data

Apr. 7, 1992 [DE] Fed. Rep. of Germany ....... 4211674

[51] Int. Cl.$^5$ ............ B60R 21/22; B62D 1/18; B62D 1/19
[52] U.S. Cl. .................. 280/775; 74/493; 280/777; 280/731
[58] Field of Search ........... 280/731, 775, 777; 74/492, 493, 552

[56] References Cited

U.S. PATENT DOCUMENTS

| | | | |
|---|---|---|---|
| 3,335,619 | 8/1967 | Curran | 74/492 |
| 3,504,569 | 4/1970 | Zoltok | 74/493 |
| 4,449,419 | 5/1984 | Soler Bruguera | 280/775 |
| 5,131,286 | 7/1992 | Sturges et al. | 280/777 |

FOREIGN PATENT DOCUMENTS

3409987 9/1985 Fed. Rep. of Germany ...... 280/775
3811215 10/1989 Fed. Rep. of Germany ........ 74/493

*Primary Examiner*—Karin L. Tyson
*Attorney, Agent, or Firm*—McGlew & Tuttle

[57] ABSTRACT

The present invention pertains to a steering column for a motor vehicle equipped with an inflatable air bag in the steering wheel (6), in which the parts (3, 4) of a steering shaft, which are connected to one another by a universal joint (5), are rotatably mounted in a housing consisting of a movable upper housing part (1) and a lower housing part (2) rigidly attached to the body, and the two parts of the housing are connected by a hinge (7) to a hinge axis (9) that extends approximately horizontally in the plane of the intersection of the axes of the universal joint, and can be interlocked with one another by the frictional engagement of a clamping device (13). In this steering column, the hinge (7) of the two housing parts (1, 2) is arranged at a spaced location from and above the central longitudinal axis (8) of the steering column, and the two housing parts (1, 2) can be interlocked with one another only in a position in which the axes of the steering shaft parts (3, 4) connected to one another by the universal joint (5) form an angle that is open toward the hinge (7), and the frictional engagement can be overcome by the recoil forces of the ignition of the air bag during the inflation of the air bag.

7 Claims, 2 Drawing Sheets

STEERING COLUMN WITH A SAFETY ELEMENT FOR A MOTOR VEHICLE EQUIPPED WITH AN INFLATABLE AIR BAG IN THE STEERING WHEEL

FIELD OF THE INVENTION

The present invention pertains to a steering column with a safety element for a motor vehicle equipped with an inflatable air bag in the steering wheel wherein parts of the steering shaft which are connected to one another by a universal joint, are rotatably mounted in a housing formed of a movable upper housing part and a lower housing part that is rigidly attached to the body of the motor vehicle two parts of the housing are connected by a hinge to a hinge access extending approximately horizontally in a plane of intersection of the axes of the universal, two parts of the housing being interlocked with one another.

BACKGROUND OF THE INVENTION

This state of the art is described in DE 3,409,987 -C2- in conjunction with EP 0,045,230 -B1-. Both documents disclose steering columns, in which the tilt of the steering wheel is adjustable, and the position set can be locked. Even though this is done by positive-locking engagement of toothed segments provided on both housing parts in the arrangement according to DE 34,09,987 -C2-, EP 0,045,230 -B1- discloses, in contrast, a clamping device for the frictionally engaged locking of the position set, as is known from other documents as well, which pertain only to height-adjustable steering columns. As a difference from the type affected by the present invention, EP 0,045,230-B1-discloses the linkage of a steering column head housing directly to the body, so that the steering shaft under the universal joint is also displaced during the adjustment of the tilt of the steering wheel. Therefore, this solution does not meet the needs in terms of comfort. This document also discloses a clamping device consisting of a bundle of plates arranged in a laminar manner with a clamp bolt extending through them with a screw connection that can be actuated manually, wherein the plates are alternatingly fastened to the head housing and to a body part.

Motor vehicles are increasingly equipped with an air bag in the steering wheel, which is explosively inflated by control members in the case of a frontal impact of the vehicle, and forms a cushion for the upper body of the driver of the vehicle. However, the desired effect is achieved only if the steering column is arranged with its central longitudinal axis at a defined tilt angle in the vehicle, so that the air bag will expand between the body of the vehicle driver, which is being thrown in the forward direction, and the steering wheel. Safety devices consisting of an inflatable air bag are ineffective in vehicles with steering columns arranged very steeply.

SUMMARY AND OBJECTS OF THE INVENTION

The object of the present invention is to design a steering column for motor vehicles with an inflatable air bag incorporated in the steering wheel such that during the ignition for inflating the air bag, the tilt position of the steering wheel automatically reaches a tilted position, in which the forces of impact of the body of the vehicle driver are introduced into the steering column approximately coaxially via the air bag.

This object is attained by the present invention by the design of the steering column wherein the hinge of the two parts of the housing is arranged at a spaced location and above a central longitudinal axis of the steering column, interlocking means being provided to interlock the two housing parts with one another only in positions in which the axes of the two steering shaft parts, connected to one another by a universal joint, form an angle open toward the hinge of the two housing parts, wherein the interlocking of the two housing parts of the interlocking means can be overcome by recoil forces caused by ignition of an airbag during inflation of the airbag.

These design characteristics are applied mainly to steering columns which are mounted into a vehicle with their central longitudinal axes at a very flat (obtuse) angle relative to the horizontal. A design according to the characteristics of the present invention is possible especially in the case of a steering column with adjustable tilt of the steering wheel. The present invention is based on the idea of utilizing the recoil energy generated during the ignition of the air bag after a frontal impact such that breaking forces, which are necessary for the destruction of a safety element locking the two housing parts, or releasing forces, which are sufficient for eliminating the frictionally engaged connection of the upper and lower housings, will be overcome, and the upper part of the steering column will be aligned by a pivoting movement approximately coaxially to the lower part of the steering column, and this lower part is already mounted in a tilt position that corresponds to the direction of action of the impact forces of the body of the vehicle driver. This means in practice that the head of the steering column is pivoted by the ignition of the air bag in the direction of the vehicle driver's body, so that the air bag will be inflated between the steering wheel and the vehicle driver's body in order to introduce the accelerating forces originating from the impact coaxially into the now essentially extended steering column. The steering column is advantageously automatically locked in this extended position of the axes of the two parts of the steering shaft in order to prevent the head of the steering column from rebounding.

Since the recoil forces induced during the ignition of the air bag are substantially greater than the frictional forces of a frictionally engaged connection between the two housing parts, which forces are necessary for maintaining the position of the steering wheel, the application of the characteristics of the present invention is particularly suitable for steering columns with adjustable tilt of the steering wheel.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
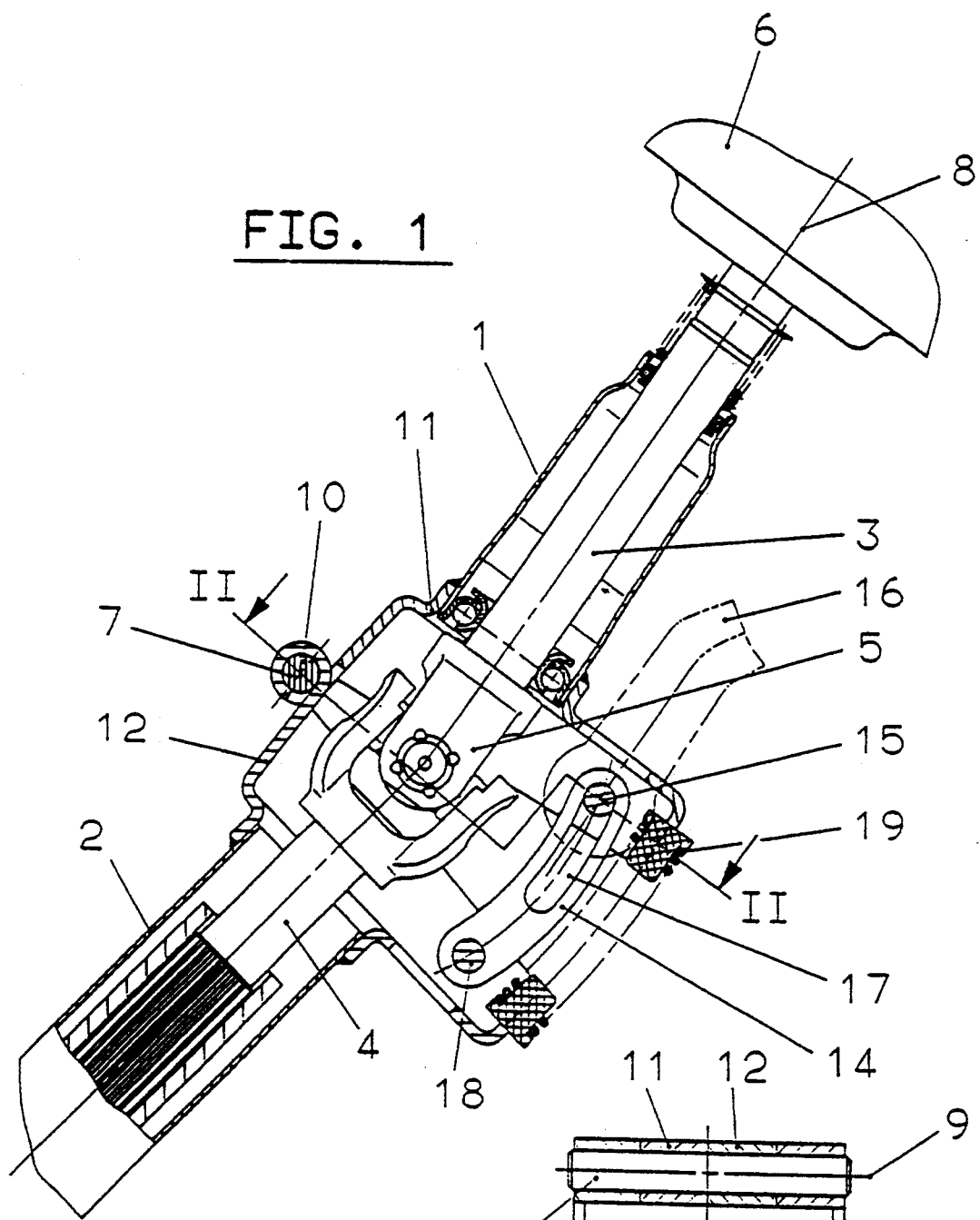
FIG. 1 is a sectional view taken in an axial plane through the upper end of a steering column in the operating position.
Figure 3:
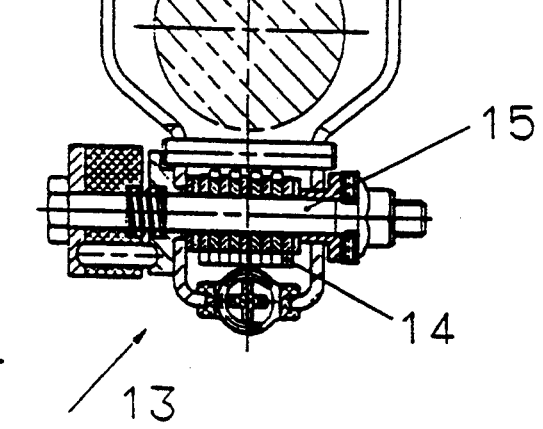
FIG. 3 is a sectional view taken approximately along line III—III in FIG. 1.
Figure 2:
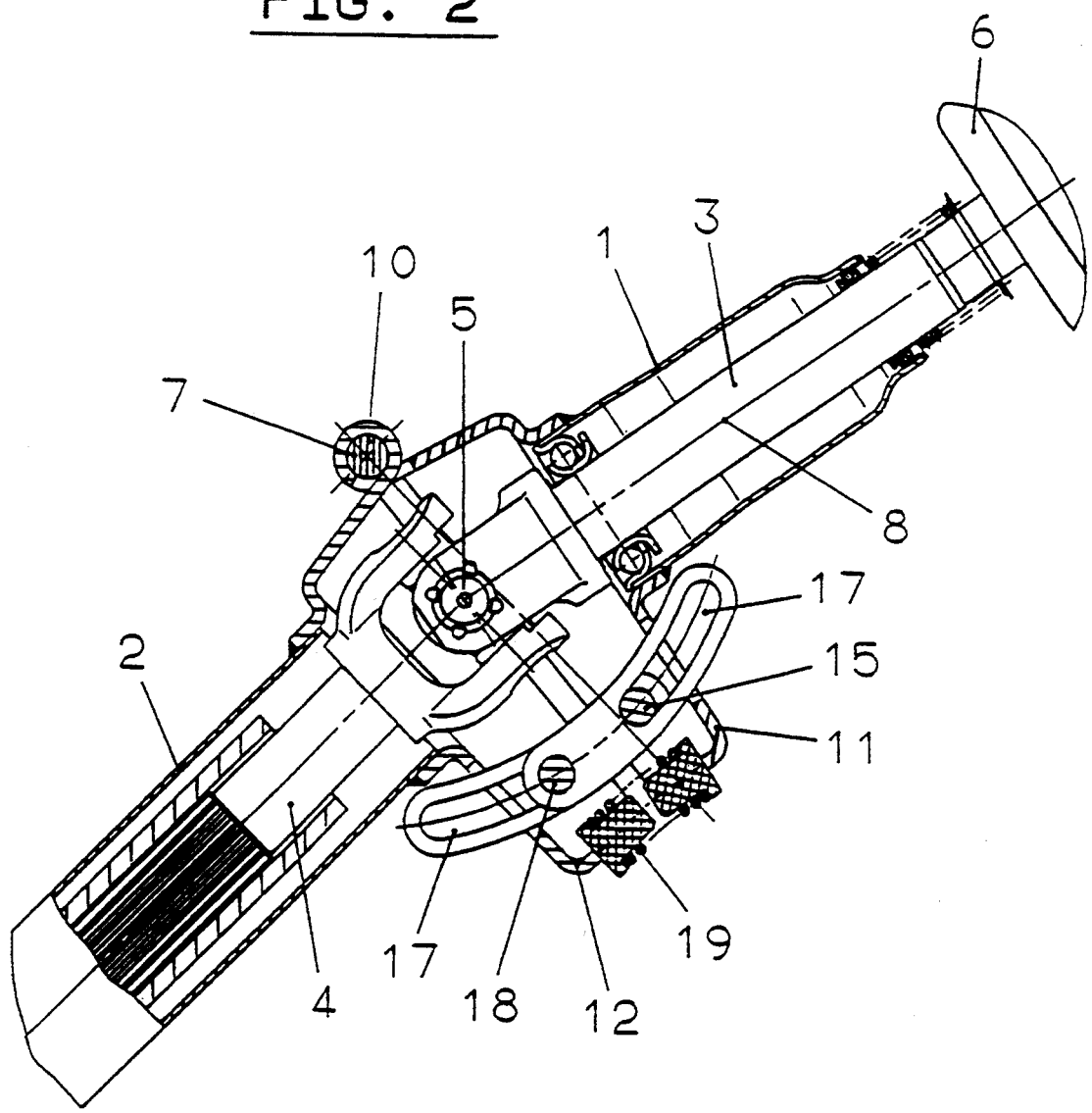
FIG. 2 is the same sectional view as in FIG. 1 but after the frictionally engaged connection between the two housing parts has been overcome.

The steering column consists of an upper housing part 1 and a lower housing part 2, in which an upper steering shaft part 3 and a lower steering shaft part 4 are rotatably mounted. The two housing parts 1 and 2 form a steering column jacket. The steering shaft parts 3 and 4 are connected by a universal joint 5. The steering wheel 6 is fastened at the free end of the upper steering shaft part 3. At the ends facing one another, the housing parts 1 and 2 are provided with a shell-shaped expansion approximately in the area of the universal joint 5, and are connected to one another by a hinge-like joint 7, which is arranged above the central longitudinal axis 8 of the steering column and at a radially spaced location therefrom. The bolt 10 of the hinge 7, whose axis 9 is located outside the housing, connects the shell-like expansions 11 and 12 attached to the respective housing parts 1 and 2. On the side that is opposite to the bolt 10 approximately diametrically to the central longitudinal axis 8, the shell parts 11 and 12 are connected to one another by a clamping device 13 in a frictionally engaged manner, and the central longitudinal axis 8 of the upper steering shaft part 3 and of the lower steering shaft part 4 form an angle that is open toward the hinge 7, as is shown in FIG. 1. The clamping device consists of a plurality of plates 14, which are arranged in a laminar manner relative to one another, are alternatingly fastened to one of the two shell parts 11 and 12, and through which a clamp bolt 15 with a screw connection, which can be actuated by a handle 16, if desired, extends. A pivoting movement of the two shell parts 11 and 12 around the axis 9 of the bolt 10 against each other into the position shown in FIG. 2 is made possible by the fact that the plates 14 have, at one of their ends, a slot 17, through which extends either the clamp bolt 15 or a fastening bolt 18. With the clamping device 13 released, the movable upper end of the steering column can be adjusted around the axis 9 of the hinge 7, and the position set can be fixed by actuating the clamping device. In addition, a buffer comprising of a coil spring 19, which buffer facilitates the adjusting movements during the setting of the tilt of the steering wheel 6, because it compensates for at least part of the weight of the steering column head, is arranged between the two 11 shell parts 11 and 12 that can be moved toward each other. In addition, a forced interlocking is provided for the end position of the two housing parts after the ignition of the air bag and the pivoting movement induced by it, in order to prevent the steering column head from rebounding. The pivoting movement of the two shell parts 11 and 12, which are arranged on the upper housing 1, on the one hand, and on the lower housing 2, on the other hand, is determined by the angle formed between the two shell parts 11 and 12, on the one hand, and by the length of the plates 14 with the slots 17 provided in them, on the other hand, so that the maximally reachable positions of the upper part of the steering column are limited by stops.

While a specific embodiment of the invention has been shown and described in detail to illustrate the application of the principles of the invention, it will be understood that the invention may be embodied otherwise without departing from such principles.

What is claimed is:

1. A steering column for a motor vehicle equipped with an inflatable airbag in the steering wheel, comprising:
   an upper steering shaft part and a lower steering shaft part, said upper and lower steering shaft parts being connected to one another by a universal joint;
   a housing formed of a movable upper housing part and lower housing part rigidly attached to a body of the motor vehicle, the upper housing part and the lower housing part being connected by a hinge at a hinge axis extending approximately horizontally in a plane of intersection of axes of said universal joint, said upper steering shaft and said lower steering shaft being rotatably mounted in said housing, said hinge being arranged at a spaced location and above a central longitudinal axis of a steering column formed by the axes of the upper steering shaft and the lower steering shaft;
   interlocking means for interlocking the upper housing part and the lower housing part with one another only in positions in which said axes of said upper steering shaft and lower steering shaft intersect one another, by said universal joint, to form an angle that is open toward said hinge, said interlocking means for maintaining said two housing parts in said position and for releasing said two housing parts by recoil forces caused by ignition of said airbag during inflation of said airbag.

2. A steering column according to claim 1, wherein: said hinge has an axis arranged outside of said housing.

3. A steering column according to claim 1, wherein: said interlocking means includes a clamping device providing frictional engagement which can be overcome by said recoil forces.

4. A steering column according to claim 3, wherein: said clamping device is arranged on a side of said housing opposite said hinge between said upper housing part and said lower housing part, diametrically to said central longitudinal axis of said steering column.

5. A steering column according to claim 3, wherein: said clamping device includes a plurality of lamellar plates which mutually engage each other and are alternatingly fastened to said housing parts, and at least one clamp lock arranged extending at right angles to said plates, and passing through a slot formed in said plates.

6. A steering column according to claim 3, further comprising:
   elastic damping means for counteracting force of gravity generated by the weight of said upper housing part, as it is moved by said recoil forces, said elastic damping means being provided adjacent said clamping device between said upper housing part and said lower housing part.

7. A steering column according to claim 1, wherein: said interlocking means forcibly interlocks said upper housing part and said lower housing part in a pivoting position in which axes of said upper steering shaft and said lower steering shaft are extending toward one another.

* * * * *